United States Patent [19]

Kapcio et al.

[11] Patent Number: 5,263,099
[45] Date of Patent: Nov. 16, 1993

[54] HIGH SPEED WINDOW AND LEVEL FUNCTION MODIFICATION FOR REAL TIME VIDEO PROCESSING

[75] Inventors: James Kapcio, Euclid; Nicholas C. Wislocki, N. Royalton, both of Ohio

[73] Assignee: Picker International, Inc., Highland Hts., Ohio

[21] Appl. No.: 438,690

[22] Filed: Nov. 17, 1989

[51] Int. Cl.$^5$ .......................... G06K 9/40; G06F 15/00
[52] U.S. Cl. ............................................ 382/54; 382/6; 364/413.13; 364/724.19
[58] Field of Search ................... 382/54, 6, 27, 49, 54; 364/413.13, 724.01, 724.19; 378/29

[56] References Cited

U.S. PATENT DOCUMENTS

| | | | |
|---|---|---|---|
| 4,394,688 | 7/1983 | Iida et al. | 358/160 |
| 4,438,495 | 3/1984 | Collins et al. | 364/414 |
| 4,776,025 | 10/1988 | Hosoda | 382/49 |
| 4,797,806 | 1/1989 | Krich | 382/27 |
| 4,799,269 | 1/1989 | Li | 382/27 |

OTHER PUBLICATIONS

Boosting On-Chip RAM Lets Logic Array Shoulder A World of New Tasks; Conway, et al.; 2328 Electronic Design 33 (1985) Feb. No. 4, Hasbrouck Hts. N.J.

*Primary Examiner*—Leo H. Boudreau
*Assistant Examiner*—Christopher S. Kelley
*Attorney, Agent, or Firm*—Fay, Sharpe, Beall, Fagan, Minnich & McKee

[57] ABSTRACT

A CT scanner (10) non-invasively examines a region of interest of a patient to create an image representation that is stored in an image memory (14). Each pixel of the image representation has a relatively large number of bits of radiation intensity resolution, e.g. 14 bits or 16k levels, which is larger than the gray scale resolution of a conventional video monitor (24), e.g. 8 bits or 256 levels. A look-up table (38) digitally filters each pixel value with digital filter values to reduce the number of levels of each pixel value to the number of gray scale levels displayable by the video monitor. While the image is being displayed, the operator selectively adjusts the digital filtering to optimize the displayed image for the intended diagnostic purpose. During the vertical flyback or other non-display periods of the video monitor, a central processor (30) generates most significant bits of addresses that read digital filter longwords from a filter memory (44). A multiplexer (54) breaks each word into a plurality of filter values or bytes which are serially conveyed to the digital filter look-up table. A least significant bit address generator (62) generates the least significant bits of the address for each filter value concurrently with its conveyance to the look-up table. The multiplexer and least significant bit address generator are clocked at a faster rate than the central processor such that within one read clock pulse of the central processor, a plurality of digital filter values are loaded into the digital filter look-up table. In this manner, image filtering via look-up table in real time is enhanced through an improved, faster loading method.

12 Claims, 2 Drawing Sheets

HIGH SPEED WINDOW AND LEVEL FUNCTION MODIFICATION FOR REAL TIME VIDEO PROCESSING

BACKGROUND OF THE INVENTION

The present invention relates to the art of image and video processing. It finds particular application in conjunction with the processing and display of medical diagnostic images and will be described with particular reference thereto. However, it is to be appreciated that the present invention may also be applicable to other environments in which image data is selectably mapped rather than being displayed directly.

CT scanners and other medical diagnostic imaging apparatus reconstruct images which are defined by a rectangular array of pixel values. Each pixel value is determined with a relatively high resolution, e.g. 14 bits or more. However, conventional video monitors have a much smaller displayable gray scale resolution, commonly eight bits or 256 gray scale levels.

Map values for mapping the higher resolution pixel values into the lower resolution video values are commonly stored in a look-up table. The look-up table is a random access memory device having an address input with the same number of bits as the pixel value resolution, e.g. 14, and a data output with the same number of bits as the video signal resolution, e.g. 8.

Commonly, the medical diagnostic image processors have an operator adjustable digital filter or mapping function. More specifically, there is a continuously adjustable level function which determines which value of the 14 bit input address provides the center gray scale value. A window adjustment selects the number of pixel value bits which are expanded, contracted, or otherwise mapped into the gray scale. That is, rather than mapping a selected 256 of the 16k pixel levels into the 256 video monitor gray scale levels, a lesser number, e.g. 128 levels, may be expanded into the 256 gray scale levels or a larger number, e.g. 1024 pixel levels, may be compressed into the 256 video monitor gray scale levels. Moreover, the relationship between the pixel and video values may be linear or non-linear, as may be selected by the operator. For example, in a monochromatic display system, those bits above the selected window are designated white, and those below the selected window are designated black. By adjusting the level and window functions, the gray scale can be defined by the most significant bits of the pixel values, the least significant bits, or any bits in between.

These window and level functions are commonly continuously adjustable in real time by the operator in order to define a gray scale which best illustrates the anatomical portion of the displayed image that is of primary diagnostic value. Each time the operator changes the window or level function, the mapping values in the 8 bit wide look-up table are changed. In the prior art equipment, a central processor would read a 32 bit longword (4 bytes) of new map values from a memory means in a first memory cycle. In a second memory cycle, the central processing unit would address the 8 bit wide look-up table and provide the first byte of new mapping values. In a third time period, the central processing unit would provide the next address to the look-up table along with the second byte of map values. In a fourth memory cycle, the CPU would address the look-up table with a third address as it transfers a third byte of the mapping data. Finally, in a fifth memory cycle, the central processor would address the look-up table and transfer the fourth byte of mapping data. In this manner, five memory cycles are required to reload four of the addresses of an 8 bit wide look-up table.

One of the problems in the medical diagnostic image field is that the operator conventionally views the image as the mapping or filter function is adjusted. The operator expects to obtain immediate visual feedback of the adjustment. Because image data is being moved through the same look-up table to create the image, the mapping function value can only be reloaded when no image data is passing through the look-up table, e.g. during the vertical blanking period. Because the vertical blanking period is much shorter than the time necessary to reload the entire new mapping function into practical size look-up tables, the function is reloaded piecemeal over several video frames. This causes a perceptible delay in the change of the mapping function and a readily perceivable distortion during the displayed image frames in which the mapping function is partially replaced.

In accordance with the present invention, a new and improved method and apparatus are provided for speeding up the process of look-up table loading such that completely reloading the filter function in a practical size look-up table within a single vertical blanking period is possible. Of course, larger, more complex look-up tables with greater numbers of address bits and more filter values can also be loaded over the course of a lesser number of video frames than previously possible.

SUMMARY OF THE INVENTION

In accordance with the present invention, an image processing system is provided in which image data passes through a look-up table that is loaded with filter values for filtering the image data before it passes to a video display device. A central processor addresses a memory means to retrieve new filter values corresponding to each of a plurality of look-up table addresses and concurrently provides addresses to the look-up table. A memory aliasing means intercepts filter values passing from the memory means to the central processor and conveys them to the look-up table more directly to replace previously loaded filter values, thereby bypassing read-write cycling through the central processor.

In accordance with another aspect of the present invention, the central processor is clocked at a first speed by a system clock and addresses the look-up table and the memory means with only a preselected fraction of the addresses. An address generating means is clocked by a faster clock to designate a plurality of intervening look-up table addresses between the fraction of the addresses designated by the central processor. The faster clocking means also clocks the memory aliasing means to supply filter values intercepted from the memory means in conjunction with each intervening address.

One advantage of the present invention is that a greater number of look-up table filter values are replaced within a single memory cycle.

Another advantage of the present invention is that the changing of the filter function causes no artifacts or image aberrations that are perceivable by the operator due to the improvement in look-up table transfer speed.

Another advantage of the present invention is that the operator perceives the filter functions as having been changed instantaneously.

Another advantage of the present invention is that larger, more complex look-up tables can be implemented in real time and video processing systems owing to the improved, faster method of loading presented.

Still further advantages of the present invention will become apparent to those of ordinary skill in the art upon reading and understanding the following detailed description of the preferred embodiments.

BRIEF DESCRIPTION OF THE DRAWINGS

The invention may take form in various components or arrangements of components and in various steps and arrangements of steps. The drawings are only for purposes of illustrating a preferred embodiment and are not to be construed as limiting the invention.

DETAILED DESCRIPTION OF THE PREFERRED EMBODIMENT

Figure 1:
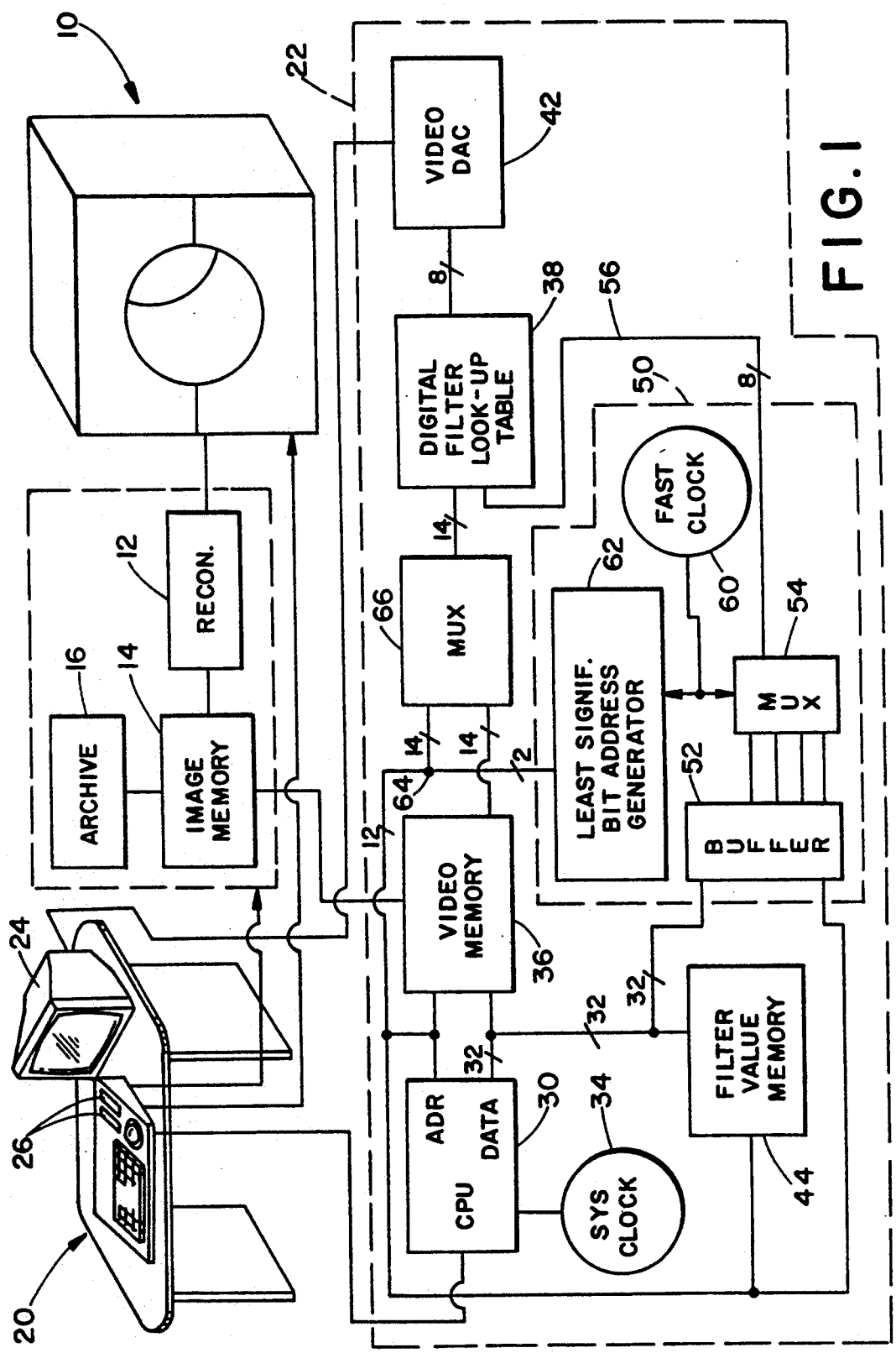
FIG. 1 is a diagrammatic illustration of an image processing system in accordance with the present invention; and, FIG. 2 is a data flow diagram illustrating the timing of the transfer of data among the components of FIG. 1.
Figure 2:
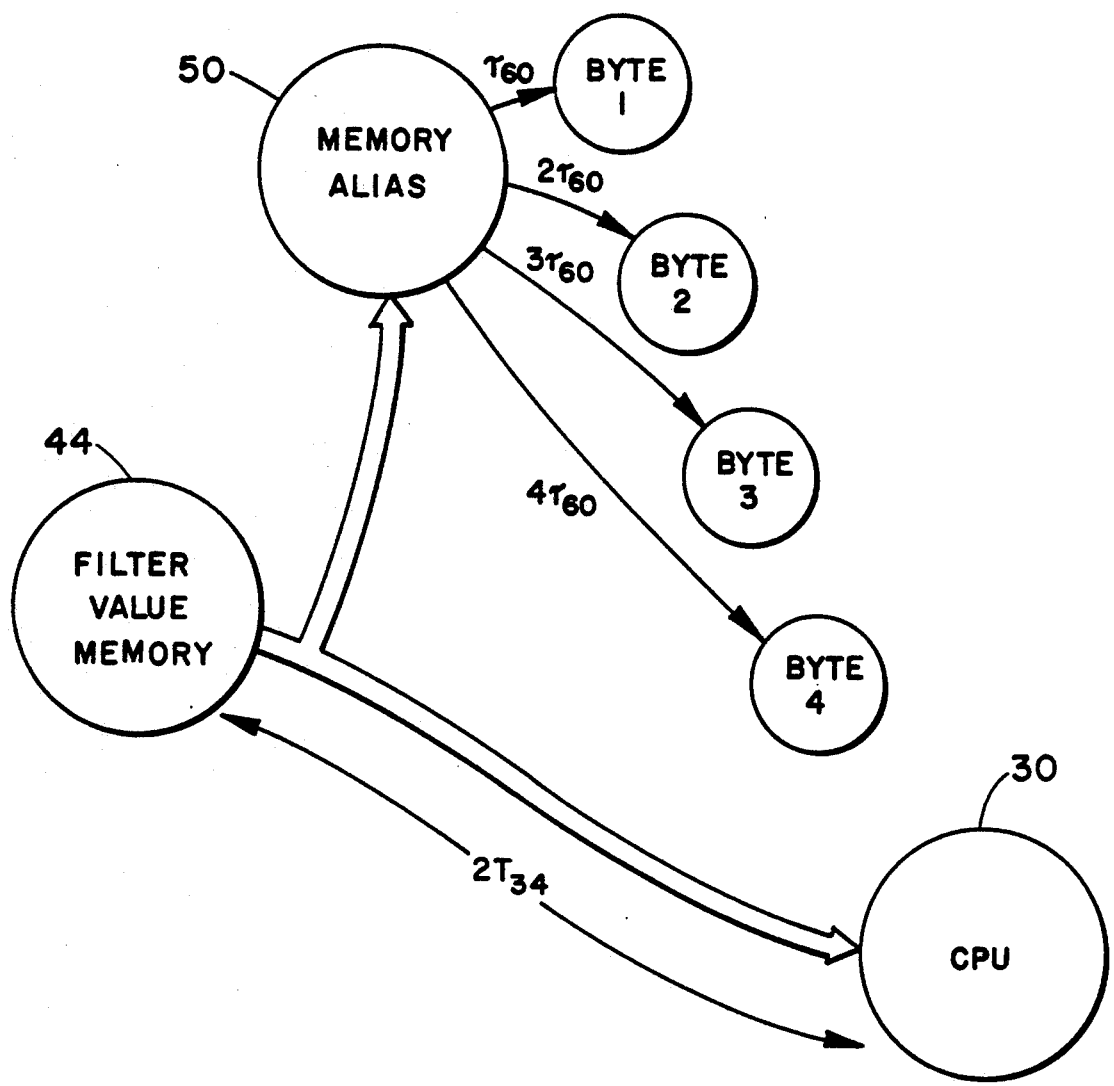

With reference to FIG. 1, a non-invasive examination means 10 non-invasively examines a selected region or regions of a patient. In the preferred embodiment, the non-invasive examination means is a computerized tomographic scanner that includes a radiation source for projecting a fan-shaped swath of radiation through the patient. An arc of radiation detectors receive radiation that has traversed the patient as the radiation source rotates around the examined region. An image reconstruction means 12 reconstructs an image representation from data collected by the detectors. The image representation is accumulated in an image memory 14 from which it may be archived on tape or disk 16. Other examination means, such as magnetic resonance, digital x-ray, nuclear camera, and other scanners are also contemplated.

When the physician or other diagnostician wants to view one of the collected image representations, appropriate commands are entered on a keyboard or data entry terminal 20. The requested electronic image representation is conveyed through an image enhancement circuit 22 and displayed on a video monitor 24. The image enhancement circuit selectively filters image or pixel values In the following description, a single circuit 22 is described in detail. Such a single circuit is suitable for monochrome. When a color display is provided, an expanded circuit is provided to include each of the three color guns of a conventional color monitor such that the filter function is adjustable for each color. More specifically, the data corresponding to each pixel of the image representation is typically 14 bits or more, e.g. 14 bits in this illustration; whereas, the video monitor 24 only has 8 bits of gray scale resolution. The keyboard 20 includes operator entry devices 26, such as optical encoders, joy sticks, trackball devices, or the like which enable the operator to selectively adjust the filter function to optimize the resultant display for the intended diagnostic purpose. The operator entry devices conventionally include a level adjustment device and a window adjustment device. With a color monitor, separate level and window adjustments are provided for each of the three video monitor guns.

The image enhancement circuit 22 includes a central processor means 30. Although a 32 bit processor is illustrated, it is to be appreciated that larger and smaller processor are also applicable to the present invention. A system clock 34 clocks the central processor and controls the data transfer rate. Image data to be enhanced is loaded from the image memory into a video RAM memory means 36. Data is conveyed from the video memory 36 along a 14 bit data bus to a look-up table 38. The look-up table, such as a 16k×8 bit look-up table, is preloaded with a selected filter function defined by 16k, 8 bit or one byte filter values. The look-up table filters or maps the 14 bit or 16k level radiation intensity resolution of the image representation into the 8 bit or 256 level gray scale resolution of the video monitor. An 8 bit data bus 40 conveys the filtered image data to a video digital to analog converter 42 which converts the 8 bit digital signal to an analog video signal with 256 gray scale levels for display on the video monitor 24.

As the operator is viewing the resultant video image, it often becomes advantageous to change the filter function to emphasize different intensity ranges of radiation transmitted through the patient representing varying density of anatomical features. As the operator adjusts the filter control input devices 26, the central processor unit addresses a source of filter function values, such as filter function memory means 44, which stores or calculates other selectable filter function values for each of the 16k addresses of the look-up table. If the filter values in the look-up table were changed while image data was being filtered, the diagnostic value of the displayed image would be destroyed. Accordingly, the look-up table filter values are changed only when image data is not being filtered, such as during vertical flyback and retrace portions of the video cycle. As discussed above, the prior art image enhancers read 32 bits of filtered data from the filter memory means 44 during a first memory read cycle and then transferred one byte of the read data during each of the next four subsequent memory write cycles into the look-up table. In this manner, five system memory cycles were required to transfer 32 bits of the filter function data.

In the present invention, the central processor addresses the filter function look-up table 38 with only a fraction of the 14 available address bits. In the preferred embodiment, the central processing unit addresses the filter function memory means 44 with only the twelve most significant bits such that only one address in four is generated. The filter function memory means 44 is programmed to transmit not only the filter function value corresponding to the received 12 bit address, but also the filter function values corresponding to the next three addresses. These four one byte filter values are transferred as a multi-byte group of data values, specifically, a 32 bit longword to the central processing unit.

The 32 bit longword is monitored or intercepted by a memory aliasing means 50 which receives the 32 bit longword or four one byte filter function values concurrently with the central processor unit. The 32 bit longword is stored in a 32 bit hold buffer 52 and read out one byte at a time by a multiplexing means 54 onto an 8 bit data line 56 to the look-up table 38. A second or fast clocking means 60 clocks the multiplexing means at a higher rate than the system clock. In the preferred embodiment in which only every fourth address is generated, the fast clock operates at four times the system memory cycle speed (which is equivalent to two system clock cycles). With each fast clock pulse, the multiplexing means 54 puts the next one byte filter data value onto the data line 56. Concurrently, a least significant bit address generating means 62 generates the two least significant bits of the address. A combining means or summing node 64 combines the twelve most significant bits of the address from the central processor with the two least significant bits from the address generating means 62 to provide a full 14 bit address signal through a multiplexing means 66 and the look-up table 38. Because the address generating means 62 is operating at the fast clock rate, the address received by the look-up table changes four times during a single memory cycle. Concurrently with the receipt of each of these four addresses, the look-up table receives each of the four one byte filter data values from the 8 bit data line 56.

In this manner, one system memory cycle is required to transfer 32 bits of filter function data as opposed to five system memory cycles in the prior art.

Of course, the central processing unit may send a different fraction of the addresses such as a half or one eighth and the least significant bit address generating means 62 will generate the intervening addresses concurrently with an appropriate fraction of the received data word being transferred to the data line 56.

For a color monitor, video memory means 36 and a digital filter look-up table 38 are provided for each color. The level and window controls 26 instruct the processor 30 which filter function is to be selected for each of the three monitor colors. A buffer 52 and a multiplexer 54 are also provided for each color to enable all three filter functions to be changed concurrently.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A diagnostic imaging system comprising:
   a non-invasive examination means for non-invasively examining a selected interior region of a subject and generating an image representation corresponding to the examined interior region;
   a digital filter means for operating on the image representation with one of a plurality of digital filter functions defined by digital filter values;
   a video display means for converting filtered image data from the digital filter means into a man-readable display;
   a processor means for generating multi-bit addresses at a first clocking rate (i) for controlling movement of the image representation through the digital filter and (ii) for controlling changing of the digital filter functions;
   a means for selectively changing the digital filter functions including:
      a source of digital filter values which receives only a fraction of each multi-bit address from the processor means and supplies a multi-byte filter data group that each define a plurality of digital filter values in response to each received address fraction,
      a memory aliasing means for intercepting the multi-byte filter data groups and supplying each of the plurality of digital filter values individually to the digital filter means, the memory aliasing means including:
         a means for receiving each multi-byte filter data group from the source,
         a fast clocking means for generating fast clocking signals at a second clocking rate faster than the first clocking rate,
         an address generating means for generating additional address fractions which complete the fraction of the address received by the source from the processor means, the address generating means being clocked by the fast clocking means to supply the generated additional address fractions to the digital filter means at the second clocking rate,
         a means for changing each multi-byte filter data group into the plurality of digital filter values and conveying each of the plurality of digital filter values to the digital filter means, the changing means being connected with the fast clocking means to be clocked thereby such that the digital filter values are conveyed to the digital filter means at the second clocking rate.

2. The diagnostic imaging system as set forth in claim 1 wherein the digital filter means includes a look-up table that is selectively loaded with the digital filter values.

3. An image processing system comprising:
   an image memory for providing image pixel values with a first number of bits;
   a digital filter means for reducing the number of bits of each digital pixel value to a second, smaller number of bits to provide filtered pixel values for display on a video display means;
   a digital filter value changing means for changing digital filter values of the digital filter means during at least one of vertical blanking and flyback periods of the video display means, the digital filter value changing means including:
      a processor means for generating a fraction of each of a plurality of addresses for the digital filter means and for retrieving digital multi-byte groups that include a plurality of digital filter values from a digital filter value source, the processor means being operatively connected with the digital filter means for supplying the fraction of each address thereto,
      a memory aliasing means for intercepting the digital multi-byte groups from the source, dividing the multi-byte groups into a plurality of the digital filter values, providing an additional address fraction corresponding to each digital filter value, and concurrently conveying each digital filter value with the corresponding additional address fraction to the digital filter means.

4. An imaging system including:
   a source of digital filter values,
   a processor means for selectively (i) generating addresses for controlling movement of image data through a digital filter means and (ii) using a first fraction of each address for causing a multi-byte filter data group which corresponds to a plurality of filter values to be read from the source,
   an address generating means clocked at a faster rate than the processor means for generating a plurality of additional address fractions concurrently with each of first address fractions, a memory aliasing means for intercepting each multi-byte filter data group and separating each multi-byte filter data group into the corresponding plurality of digital filter values in response to the additional address fractions and supplying the corresponding plurality of digital filter values to the digital filter means to change the filter values of the digital filter means.

5. An imaging system comprising:

a source of digital filter values;

a processor means for selectively (i) generating addresses for controlling movement of image data through a digital filter means and (ii) using a first fraction of each address for causing a multi-byte filter data group which corresponds to a plurality of filter values to be read from the source, the processing means supplying each fractional address to the digital filter means concurrently with supplying each fractional address to the source, a memory aliasing means for intercepting and separating each multi-byte filter data group into the corresponding plurality of digital filter values and supplying the corresponding plurality of digital filter values to the digital filter means to change the filter values of the digital filter means the memory alias means further including:

a buffer for receiving each multi-byte group from the source;

a multiplexer means for serially conveying each of the digital filter values of the multi-byte group from the buffer to the digital filter means.

6. The imaging system as set forth in claim 5 wherein the memory aliasing means further includes an address generating means for generating additional address fractions to complete the fraction of each fractional address from the processor means, the address generator means being operatively connected with the digital filter means to provide the generated additional address fractions thereto.

7. The imaging system as set forth in claim 6, wherein the memory aliasing means further includes a clock means for clocking the address generator means and the multiplexer means to send the additional address fractions and the digital filter values to the digital filter means at a faster rate than a clocking rate of the processor means.

8. The imaging system as set forth in claim 5 wherein the digital filter means includes a look-up table that is selectively loaded with digital filter values.

9. A method of diagnostic imaging comprising:

non-invasively examining a selected internal region of a patient and generating an image representation of the interior region;

digitally filtering each pixel value of the image representation with digital filter values of a digital filter function to create filtered image data;

displaying the filtered image data on a video monitor;

during at least one of vertical flyback and retrace portions of a video cycle of the monitor, changing the digital filter function, the step of changing the digital filter function including:

concurrently providing a fraction of an address designation to the digital filter and using each address fraction to retrieve a digital multi-byte group of data containing a plurality of digital filter values from a source of digital filter values;

separating each multi-byte group into the contained plurality of digital filter values;

generating a plurality of additional address fractions corresponding to the address fraction used to retrieve each multi-byte group, each of the additional address fractions corresponding to one of the digital filter values separated from the multi-byte group;

concurrently supplying each of the additional address fractions and the corresponding digital filter value for serially loading each of the plurality of the filter values of the retrieved multi-byte group into the filter function to replace previous digital filter values.

10. Am imaging method comprising:

digitally filtering each pixel value of an image representation with digital filter function composed of filter values loaded in a look-up table to create filtered image data;

displaying the filtered image data on a video monitor;

during at least one of vertical flyback and retrace portions of a video cycle of the video monitor, changing the digital filter function, the step of changing the digital filter function including:

concurrently providing a first fraction of an address to the look-up table and retrieving a digital multi-byte group of data containing a plurality of filter values from a source of digital filter values;

separating the plurality of filter values;

generating additional fractions of the address corresponding to the plurality of separated filter values;

serially supplying each of the separated filter values concurrently with the corresponding additional fractions of the address to the look-up table to replace the digital filter value at the address designation designated by a combination of the first fraction of the address and the additional fraction of the address.

11. The imaging system as set forth in claim 4 wherein the first fraction of each address includes the most significant bits of the address and wherein the additional address fractions include the least significant bits of the addresses.

12. The method as set forth in claim 10 wherein the first fractions of the addresses include the most significant bits and the additional fractions of the addresses include the least significant bits of the addresses.

* * * * *